(12) United States Patent
Alay et al.

(10) Patent No.: US 8,179,848 B2
(45) Date of Patent: May 15, 2012

(54) VIDEO MULTICAST USING RELAY DEVICES DEFINED BY A CHANNEL QUALITY PARAMETER HIERARCHY

(75) Inventors: Ozgu Alay, Brooklyn, NY (US); Elza Erkip, New York, NY (US); Thanasis Korakis, Brooklyn, NY (US); Shivendra S. Panwar, Freehold, NJ (US); Yao Wang, Livingston, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 752 days.

(21) Appl. No.: 12/327,554

(22) Filed: Dec. 3, 2008

(65) Prior Publication Data

US 2009/0147746 A1 Jun. 11, 2009

Related U.S. Application Data

(60) Provisional application No. 60/991,887, filed on Dec. 3, 2007.

(51) Int. Cl.
*H04W 4/00* (2009.01)
(52) U.S. Cl. .................. 370/329; 370/492; 370/328
(58) Field of Classification Search ............... None
See application file for complete search history.

(56) References Cited

U.S. PATENT DOCUMENTS

| | | | | |
|---|---|---|---|---|
| 5,794,116 A | * | 8/1998 | Matsuda et al. | 725/114 |
| 2004/0071128 A1 | * | 4/2004 | Jang et al. | 370/349 |
| 2008/0056199 A1 | * | 3/2008 | Park et al. | 370/332 |

* cited by examiner

*Primary Examiner* — Ricky Ngo
*Assistant Examiner* — David Oveissi
(74) *Attorney, Agent, or Firm* — John C. Pokotylo; Straub & Pokotylo

(57) ABSTRACT

Improved distribution of video information in an infrastructure-based wireless network is provided. A wireless channel condition between the video server node and each of the plurality of receiver nodes is determined. Receiver nodes are assigned into one of a first group and a second group using the measured wireless channel conditions, wherein receiver nodes assigned to the first group have, on average, a better measured wireless channel condition than that of receiver nodes assigned to the second group. At least some of the receiver nodes of the first group of nodes are selected to serve as relay nodes. Video information is then transmitted wirelessly from the video server node to the receiver nodes assigned to the first group. Each of the selected relay nodes then transmits at least a part of the video information to the receiver nodes of the second group.

42 Claims, 8 Drawing Sheets

US 8,179,848 B2

VIDEO MULTICAST USING RELAY DEVICES DEFINED BY A CHANNEL QUALITY PARAMETER HIERARCHY

§0. PRIORITY CLAIM

This application claims the benefit of U.S. Provisional Patent Application Ser. No. 60/991,887 (incorporated herein by reference and referred to as "the '887 provisional"), titled "LAYERED VIDEO MULTICAST USING RELAYS" filed on Dec. 3, 2007, and listing Ozgu ALAY, Elza ERKIP, Thanasis KORAKIS, Shivendra S. PANWAR and Yao WANG as the inventors. The present invention is not limited to requirements of the particular embodiments described in the '887 provisional.

§1. BACKGROUND OF THE INVENTION

§1.1. Field of the Invention

The present invention concerns wireless communications. In particular, the present invention concerns wireless distribution of video content.

§1.2. Background Information

In recent years, the demand for video applications over wireless networks has risen with the increase in both the bandwidth of wireless channels and the computational power of mobile devices. To provide efficient delivery among a group of users simultaneously, multicast has been used as an effective solution, as it saves network resources by sharing the data streams across receivers (e.g., nodes or client devices). Unfortunately, however, the use of heterogeneous receivers causes a higher packet loss ratio and higher bandwidth variations of wireless channels. This makes video multicast over wireless networks challenging.

Wireless channels can be characterized by their bursty and location dependent errors. Hence, each user in a multicast system will most likely lose different packets. Although a simple Automatic Repeat reQuest ("ARQ") based scheme is sometimes used to request lost packets, such a scheme is not a good solution for video multicast over wireless channels since it can cause a large volume of retransmissions.

There are several studies discussing error control in video multicast over wireless networks. (See, e.g., the articles: P. Ge, P. McKinley, "Leader-Driven Multicast for Video Streaming on Wireless LANS", *Proceedings of IEEE ICN*, (2002); and I. Bajic, "Efficient Error Control for Wireless Video Multicast," *Proceedings of IEEE MMSP*, (2006), both incorporated herein by reference.) In a multicast scenario, the use of heterogeneous receivers is a concern since various receivers have different connection qualities and power limitations. Scalable (layered) video coding, where different numbers of layers of video data can be received by different clients with different quality reception to provide video of different quality levels, is one approach to solve the heterogeneity problem. Several researchers have studied layered video multicast in infrastructure-based wireless networks. (See, e.g., the articles: T. A. Lee, S. G. Chan, Q. Zhang, W. Zhu, and Y. Zhang, "Allocation of Layer Bandwidths and FECs for Video Multicast Over Wired an Wireless Networks," *IEEE Transactions on Circuits and Systems for Video Technology*, Vol. 12, No. 12, pp. 1059-1070 (December 2002); A. Majumdar, D. Sachs, I. Kozintsev, "Multicast and Unicast Real-Time Video Streaming over Wireless LANs," *IEEE Transactions on Circuits and Systems for Video Technology*, Vol. 12, pp. 524-534 (June 2002); T. Kim and M. Ammar, "A Comparison of Heterogeneous Video Multicast Schemes Layered Encoding or Stream Replication," *IEEE Transactions on Multimedia*, Vol. 7, No. 6, pp. 1123-1130 (December 2005); and L. Lao, J. Cui, M. Y. Sanadidi and M. Gerla, "Scalable and Adaptive Multicast Video Streaming for Heterogeneous and Mobile Users," *Proceedings of IEEE ISWCS* (2005), each of which is incorporated herein by reference.) Moreover, video multicast over ad hoc networks has been considered in the articles, S. Mao, X. Cheng, Y. T. Hou, and H. Sherali, "Multiple Tree Video Multicast Over Wireless Ad-Hoc Networks," *Proc. of IEEE BROADNETS* (2004), and W. Wei and A. Zakhor, "Multiple Tree Video Multicast Over-Wireless Ad-Hoc Networks," *IEEE Trans. Circuits Syst. Video Technol.*, Vol. 17, No. 1, pg. 215 (January 2007) (both incorporated herein by reference), which propose to use multiple description video to overcome the unreliability of wireless links. However, none of these works consider the use of cooperation among receivers (e.g., nodes or client devices).

Generally, receivers may have very different channel qualities, with ones closer to the sender having better quality on average than receivers further from the sender. In a conventional multicast system, the sender adjusts its transmission rate to the receiver with the worst channel conditions (to ensure that all clients receive adequate quality video). Consequently, all receivers of the system can be severely affected if even just one receiver is affected by path loss and multipath fading, or otherwise has poor channel conditions.

§2. SUMMARY OF THE INVENTION

Exemplary embodiments consistent with the present invention may provide an improved distribution of video information in an infrastructure-based wireless network. Such exemplary embodiments may do so as follows. A wireless channel condition between the video server node and each of the plurality of receiver nodes is measured (or accepted, or otherwise determined). Each of the plurality of receiver nodes are assigned into one of a first group and a second group using the measured wireless channel conditions, wherein receiver nodes assigned to the first group have, on average (e.g., on average over time), a better measured wireless channel condition than that of receiver nodes assigned to the second group. At least some (e.g., one or more) of the receiver nodes of the first group of nodes are selected to serve as relay nodes. Video information (e.g., N layers) is then transmitted wirelessly from the video server node for reception by each of the receiver nodes assigned to the first group. Each of the selected relay nodes then transmit at least a part (e.g., M≦N layers) of the video information for reception by at least some of the receiver nodes of the second group such that the relay nodes collectively transmit the at least a part of the video information to all of the receiver nodes of the second group. Receiver nodes assigned to the first group receive, decode and render the received video information. Similarly, receiver nodes assigned to the second group, receive, decode and render the received at least a part of the video information. The receiver nodes assigned to the second group may also use the (1) video information transmitted wirelessly by the source node and/or (2) copies of the at least a part of the video information transmitted by other relay nodes (that is, relay nodes not assigned to it), to the extent such information is received.

§3. BRIEF DESCRIPTION OF THE DRAWINGS

§4. DETAILED DESCRIPTION

The present invention may involve novel methods, apparatus, message formats, and/or data structures for improving video distribution, such as video distribution within an infrastructure-based wireless network for example. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

An exemplary environment in which embodiments consistent with the present invention may be used is introduced in §4.1. Then, exemplary methods for performing operations consistent with the present invention are described in §4.2. Next, exemplary apparatus for performing various operations and generating and/or storing various information in a manner consistent with the present invention are described in §4.3. Refinements, alternatives and extensions are described in §4.4. Finally, some conclusions about such exemplary embodiments are provided in §4.5.

Figure 1:
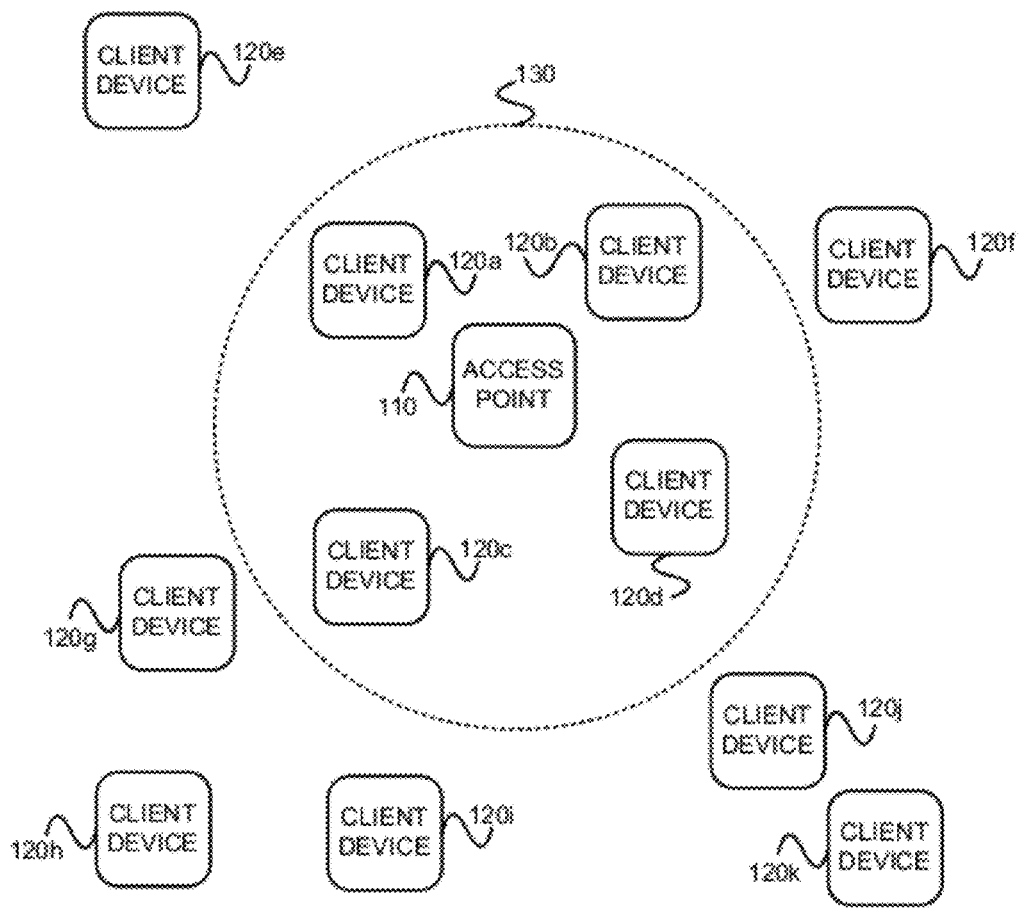
FIG. 1 illustrates an infrastructure-based wireless network in which exemplary embodiments consistent with the present invention may be used.

§4.1 Exemplary Environment in which Embodiments Consistent with the Present Invention may be Used FIG. 1 illustrates an infrastructure-based wireless network 100 in which the embodiments consistent with the present invention may be used. In the network 100, access point 110 serves as a video server node. Video transmitted by the access point 110 is to be rendered on various client devices 120a-120k (also referred to as "receiver nodes").

User cooperation is one effective technique to combat path loss and fading where nodes process and forward a received signal transmitted by other nodes to their intended destination. (See, e.g., the article A. Sendonaris, E. Erkip, and B. Aazhang, "User Cooperation Diversity—Part I and Part II," *IEEE Trans. Commun.*, Vol. 51, pp. 1927-48 (November 2003), which is incorporated herein by reference.) Cooperation techniques have been extensively studied as a means to provide spatial diversity. (See, e.g., the article, J. N. Laneman, D. N. C. Tse, and G. W. Wornell, "Cooperative Diversity in Wireless Networks: Efficient Protocols and Outage Behavior," *IEEE IT*, Vol. 50, No. 12, p. 3062 (December 2004), which is incorporated herein by reference.) Cooperation of users can also be used to reduce source distortion by providing unequal error protection. Previous work by one or more of the present inventors investigated both physical-layer and MAC-layer cooperation for point-to-point video communication. (See the articles: H. Y. Shutoy, D. Gunduz, E. Erkip and Y Wang, "Cooperative Source and Channel Coding for Wireless Multimedia Communications," *IEEE Journal of Selected Topics In Signal Processing*, Vol. 1, Issue 2, p. 295 (August 2007); H. Shutoy, Y. Wang and E. Erkip, "Cooperative Source and Channel Coding for Wireless Video Transmission", *Proceedings of IEEE ICIP* (2006); P. Liu, Z. Tao, Z. Lin, E. Erkip, and S. Panwar, "Cooperative Wireless Communications: A cross-layer Approach," *IEEE Wireless Communications*, Vol. 13, No. 4, p. 8492 (August 2006); and P. Liu, Z. Tao, S. Narayanan, T. Korakis, and S. Panwar, "CoopMAC: A Cooperative MAC for Wireless LANs," IEEE *Journal of Selected Topics In Communications*, Vol. 25, Issue 2, p. 340 (February 2007), each of which is incorporated herein by reference. See also, U.S. Pat. No. 7,330,457, titled "Cooperative Wireless Communications," issued on Feb. 12, 2008, and incorporated herein by reference.) The present inventors believe that user cooperation is especially attractive for multicast.

At least some exemplary embodiments consistent with the present invention integrate layered video coding with cooperative communication to enable efficient and robust video multicast in infrastructure-based wireless networks. In conventional multicast design, receivers with a good channel quality unnecessarily suffer and see a lower quality video than they would have if the system were targeted to them. The basic idea behind the cooperative multicast is that all the receiver nodes 120a-120k are divided into two groups—those receiver nodes within the area defined by circle 130 (referred to as being assigned to Group 1) and those receiver nodes outside 130 (referred to as being assigned to Group 2). Receiver nodes in Group 1 (120a-120d) have better average (e.g., in terms of average over time, not necessarily average over all receivers) channel quality than receiver nodes in Group 2 (120e-120k). The access point (which acts as a video server node) 110 chooses its transmission rate (and/or its modulation and channel coding schemes) based on the worst channel quality of any of the receiver nodes 120a-120d assigned to Group 1. Then, one or more selected receiver nodes in Group 1 will relay at least a part of the received information (e.g., all or selected received packets) to receiver nodes assigned to Group 2 with the modulation and channel coding schemes chosen based on the worst channel quality of relays to Group 2 receivers (or based on the worst channel quality between a given relay node and those of the Group 2 receivers to which it transmits). (Note that there may be additional conditions. For example, one additional condition might be that the worst channel quality of a receiver node assigned to Group 1 should be better than the worst channel quality of a receiver node assigned to Group 2.)

In general, Group 2 receiver nodes can combine any received video information from the video server node and the relay node(s), such as, for example different copies of the same video information, and/or different layers of the same video content. More than one copy of the same video information may be cooperatively decoded. However, even with a simple multi-hop strategy, in which Group 2 receivers only listen to their designated relay, substantial gains in signal quality are achievable.

In at least some embodiments consistent with the present invention, the relays may be selected and designated in a centralized manner, for example by the access point. More specifically, the access point may use measured channel conditions between it and other nodes in the wireless network to assign receiver nodes to Groups 1 and 2, and to select relay nodes. Further, the access point may use one or more control packets (e.g., a beacon) to assign Group 2 node identifiers (e.g., MAC addresses) to a particular relay node in Group 1. These assignments may be based on measured channel conditions between all of the nodes and the access point, and/or measured or inferred channel conditions between each receiver node of Group 1 with each receiver node of Group 2. Since at least some of the receiver nodes of the wireless network may be mobile, receiver nodes can be periodically checked and if necessary, such receiver nodes may be reassigned to a different group. Similarly, those receiver nodes of Group 1 to serve as relays may be periodically reassigned.

Embodiments consistent with the present invention might be used in an infrastructure-based wireless network (wireless networks with an access point, such as WLAN, 3G or WiMAX for example, as opposed to "ad hoc" wireless networks) in which the video server node (e.g., a base station or access point) is multicasting video to dense, uniformly distributed multicast receiver nodes within its coverage area ($r_d$). To simplify examples illustrating operations of exemplary embodiments consistent with the present invention, consider a path loss channel model where the channel condition solely depends on the distance between sender node and receiver node. In other words, it may be assumed that receiver nodes closer to the sender node may have better channel qualities, and can therefore support higher transmission rates, than receiver nodes further from the sender node. Naturally, exemplary embodiments consistent with the present invention can be more general, and work in environments in which channel quality is a function of one or more other factors.

§4.2 Exemplary Methods

Figure 2:
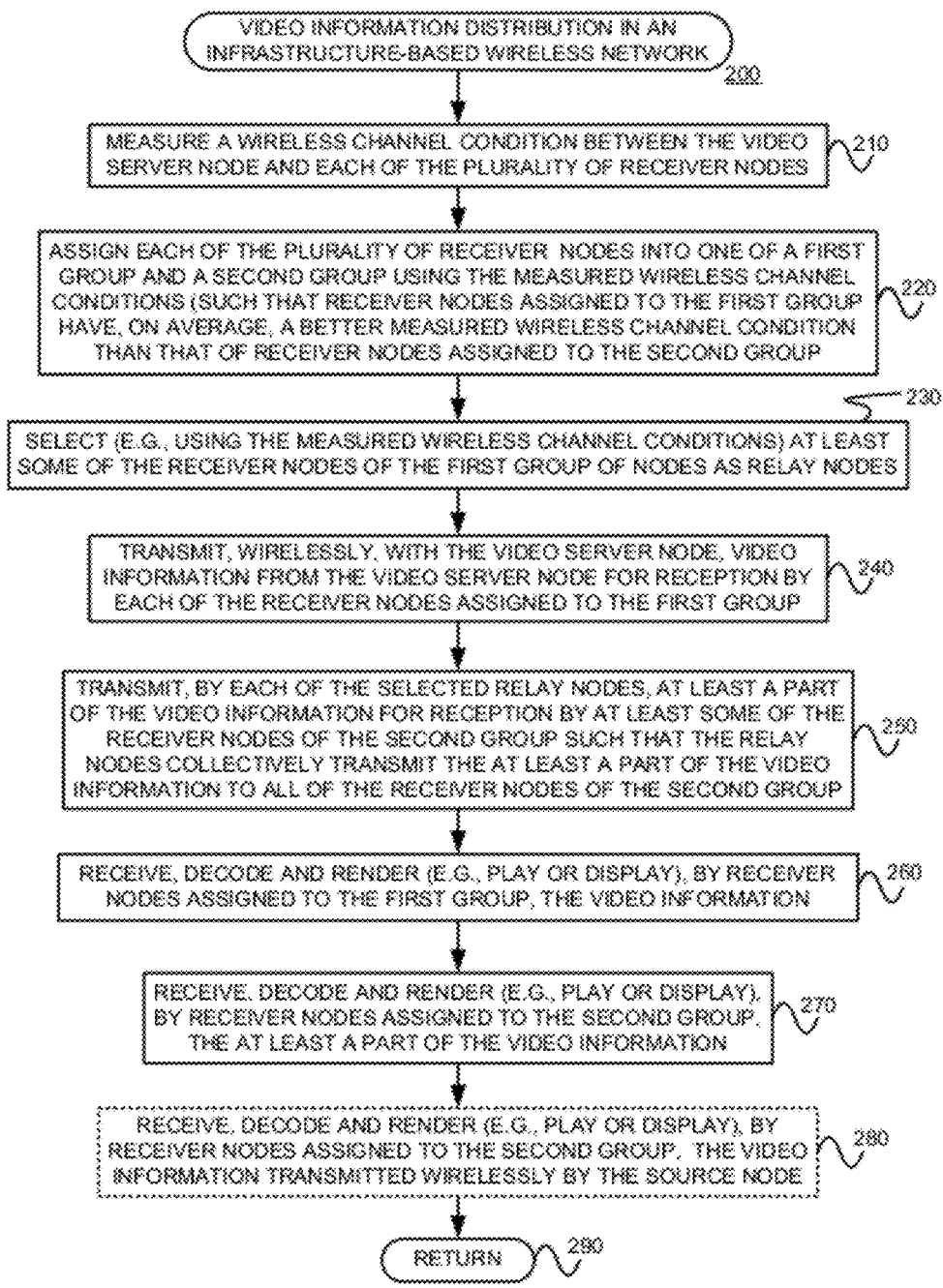
FIG. 2 is a flow diagram of an exemplary method for distributing video information in a manner consistent with the present invention.

FIG. 2 is a flow diagram of an exemplary method 200 for distributing video information in a manner consistent with the present invention. A wireless channel condition between the video server node and each of the plurality of receiver nodes is measured (or accepted, or otherwise determined). (Block 210) Each of the plurality of receiver nodes are assigned into one of a first group and a second group using the measured wireless channel conditions, wherein receiver nodes assigned to the first group have, on average (e.g., on average over time), a better measured wireless channel condition than that of receiver nodes assigned to the second group. (Block 220) At least some (e.g., one or more) of the receiver nodes of the first group of nodes are selected to serve as relay nodes. (Block 230) Video information (e.g., N layers) is then transmitted wirelessly from the video server node for reception by each of the receiver nodes assigned to the first group. (Block 240) Each of the selected relay nodes then transmit at least a part (e.g., $M \leq N$ layers) of the video information for reception by at least some of the receiver nodes of the second group such that the relay nodes collectively transmit the at least a part of the video information to all of the receiver nodes of the second group. (Block 250) Receiver nodes assigned to the first group receive, decode and render the received video information. (Block 260) Similarly, receiver nodes assigned to the second group, receive, decode and render the received at least a part of the video information. (Block 270) The receiver nodes assigned to the second group may also use the (1) video information transmitted wirelessly by the source node and/or (2) copies of the at least a part of the video information transmitted by other relay nodes (that is, relay nodes not assigned to it), to the extent such information is received. (Block 280) The method 200 is then left. (Node 290)

§4.2.1 Exemplary Methods using Omni-Directional Antennas

Figure 3:
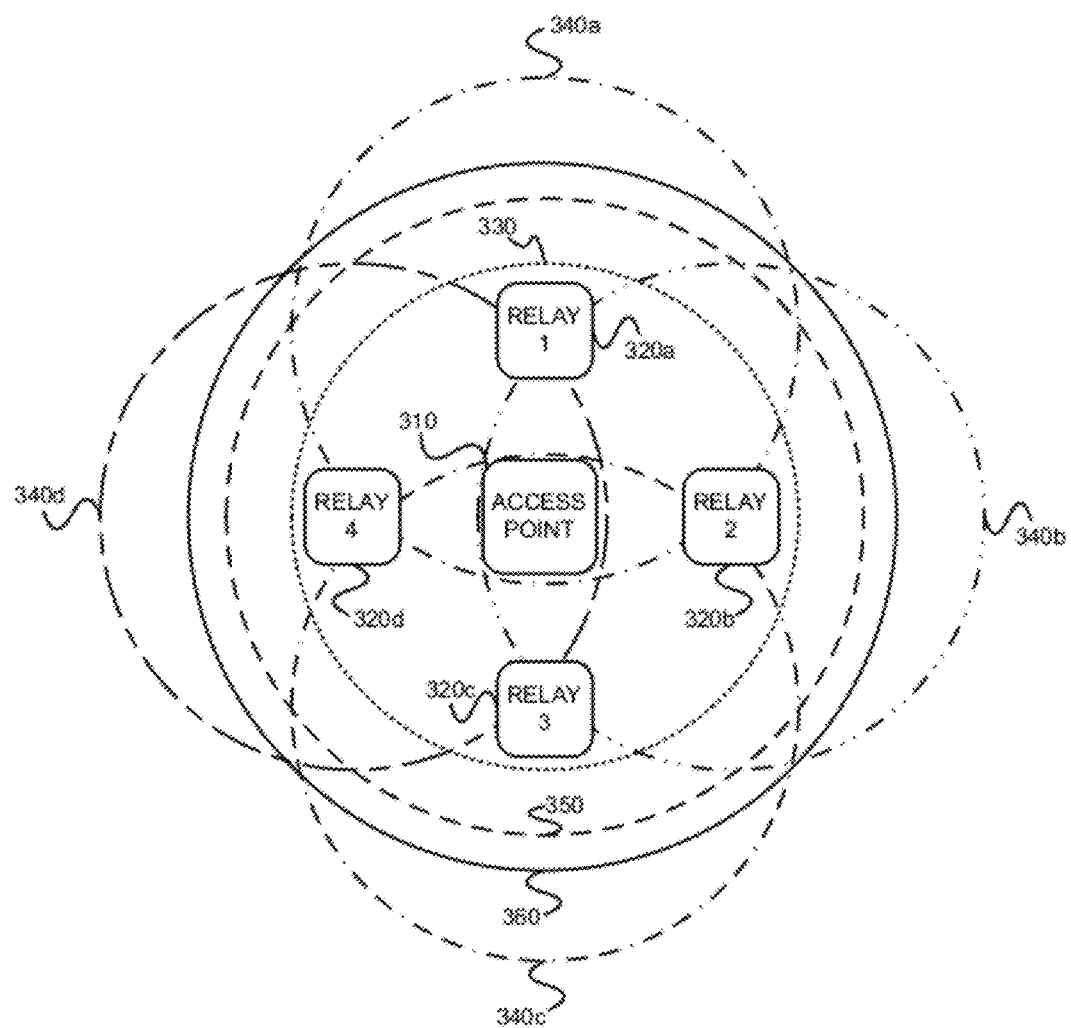
FIG. 3 illustrates an exemplary embodiment consistent with the present invention in which relay nodes employ omni-directional transmitters.

FIG. 3 illustrates an exemplary embodiment consistent with the present invention using transmission with omni-directional antennas where each relay 320a-320d targets a subgroup of Group 2 receiver nodes (those nodes outside 330), and where each relay transmits at a different time slot than the other relays. For example, relay 1 320a transmits to receiver nodes within area 340a, relay 2 320b transmits to receiver nodes within area 340b, relay 3 320c transmits to receiver nodes within area 340c, and relay 4 320d transmits to receiver nodes within area 340d. Note, however, that multiple copies of the same packet from different relays could be used in order to improve quality (via redundancy). Further note that both the links of the access point-to-Group 1 receiver nodes and the links of the relay nodes-to-Group 2 receiver nodes have a good quality, and can therefore transmit at higher sustainable transmission rates than those of access point-to-Group 2 receiver nodes. Thus, the receiver nodes of Group 1 and of Group 2 can render higher quality video than in conventional video multicast schemes. It is assumed that at sustainable transmission rates, packet loss is negligible. This can be achieved by using sufficient amount of error correction. Furthermore, with the same sender transmission power, it is likely that a larger coverage area can be achieved ($r_{360} > r_{350}$).

§4.2.2 Exemplary Methods using Directional Antennas

Figure 4:
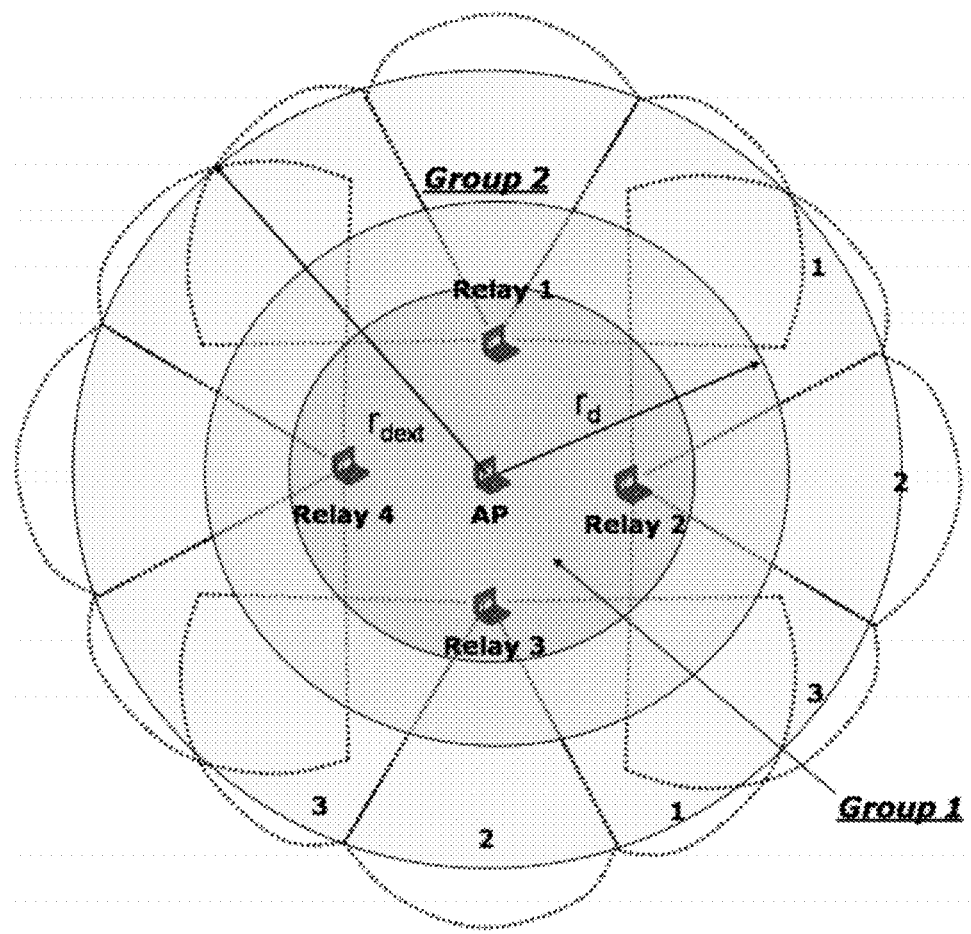
FIGS. 4 and 5 illustrate an exemplary embodiment consistent with the present invention in which relay nodes employ directional transmitters.
Figure 5:
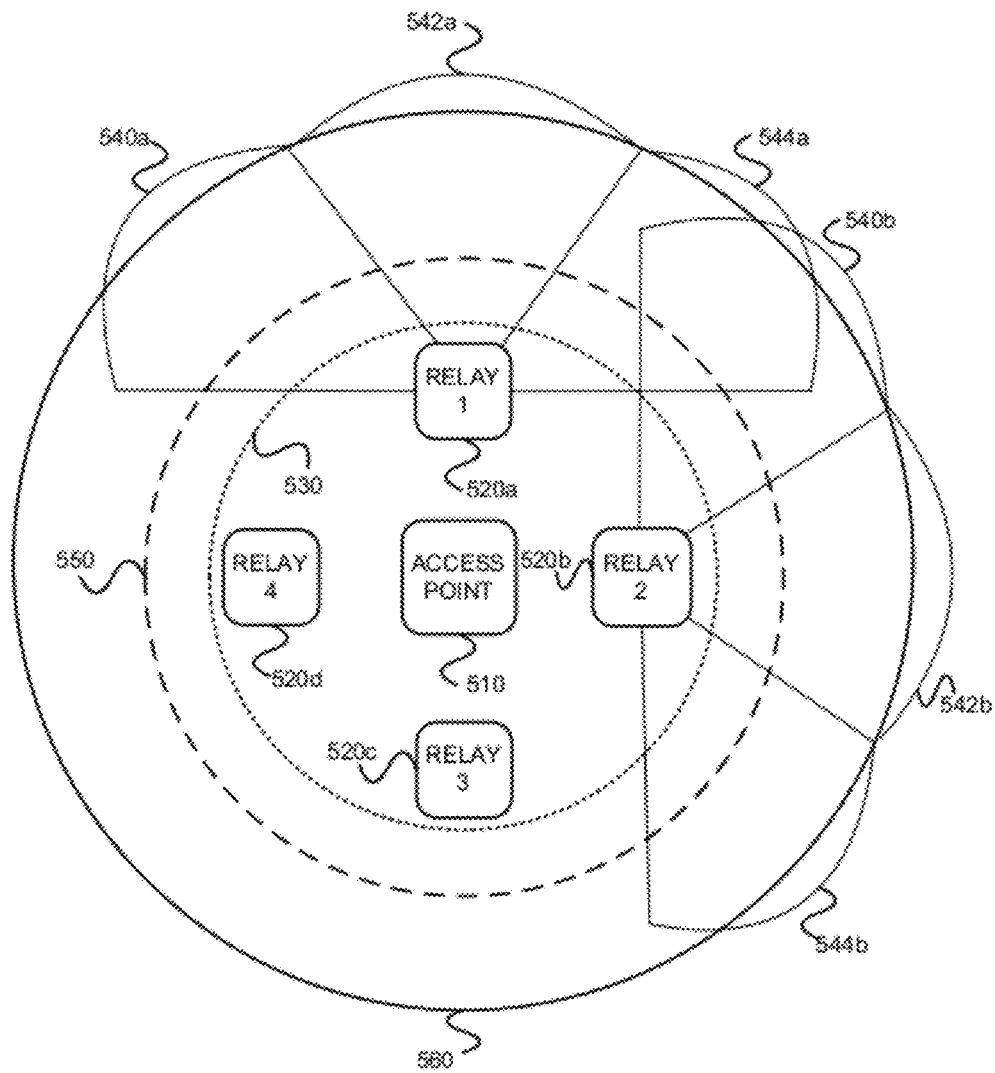

With the setup with omni-directional transmission, the relays do not transmit simultaneously. This reduces the system efficiency. To circumvent this problem, directional antennas may be used for relay transmission (where relay nodes are equipped with directional antennas). The relayed data is directionally transmitted in the second hop to its targeted subgroup which is depicted in FIGS. 4 and 5. (FIG. 5 is a simplified illustration showing only transmissions of two of the four relay nodes, in order to clarify the drawing.) In these figures, four relay nodes 520a-520d are responsible for transmitting the video in the second hop. In this example, each relay node uses three (3) beams and transmits each relayed packet three times, one after the other, scanning the area around it. By scheduling simultaneous transmissions clockwise for each relay (e.g., all relays transmit simultaneously using their beam 1 (540a, 540b, etc. (not shown)), then using beam 2 (542a, 542b, etc. (not shown)) and finally using beam 3 (544a, 544b, etc. (not shown)), efficient spatial reuse is achieved. Additionally, directional transmission increases the signal energy towards the direction of the receiver node resulting in a further increase of the coverage area ($r_{dext} > r_{ext} > r_d$). Although directional antennas are more expensive to operate at present, the potential performance gain can be significant. Known techniques may be used to adjust transmission if a relay node is moved or reoriented. In addition, as already discussed above, the relay nodes can be periodically reassigned.

§4.2.3 Exemplary Operations by Video Source Node and Receiver Nodes

Figure 6:
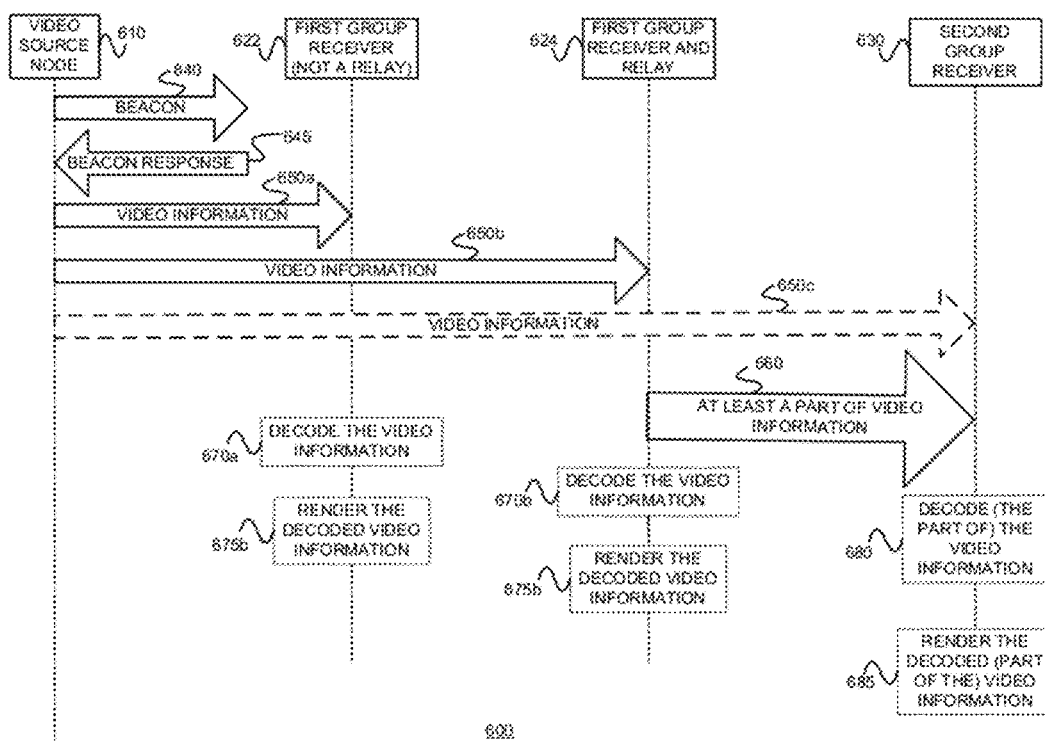
FIG. 6 is a diagram illustrating operations performed by various components in an exemplary embodiment consistent with the present invention.

FIG. 6 is a diagram illustrating operations performed by various components in an exemplary embodiment consistent with the present invention. A video source node 610 (e.g., an access point or base station) can use beacon signals 640 and/or other network discovery protocols to discover receiver nodes and channel quality via beacon response signals 645 and/or replies under other protocols. The video source node 610 may then assign one or more receiver nodes to a first group and one or more receiver nodes to a second group. At least one of the receiver nodes of the first group will also act as a relay node. In this example, nodes 622 and 624 are assigned to the first group, node 624 is a relay node (while node 622 is not), and receiver node 630 is assigned to the second group.

The video source node 610 transmits video information 650 for receipt by the receiver nodes 622, 624 of the first group, as indicated by 650a and 650b. (Note that it is possible that the receiver node 630 of the second group might also receive the transmitted video information 650c, and/or copies of the at least a part of the video information transmitted by other relay nodes (that is, relay nodes not assigned to it) (not shown).) The relay node 624 relays at least a part of the video information 660 to the receiver node 630 of the second group.

Each of the receiver nodes 622 and 624 of the first group decodes and renders the received video information. (Blocks 670a, 670b, 675a and 675b) The receiver node 630 of the second group decodes and renders the received part of the video information. (Blocks 680 and 685). If the receiver node 630 of the second group received video information 650c, and/or copies of the at least a part of the video information transmitted by other relay nodes (that is, relay nodes not assigned to it) (not shown), it may also use (e.g., cooperatively decode) such information.

§4.3 Exemplary Apparatus

Figure 7:
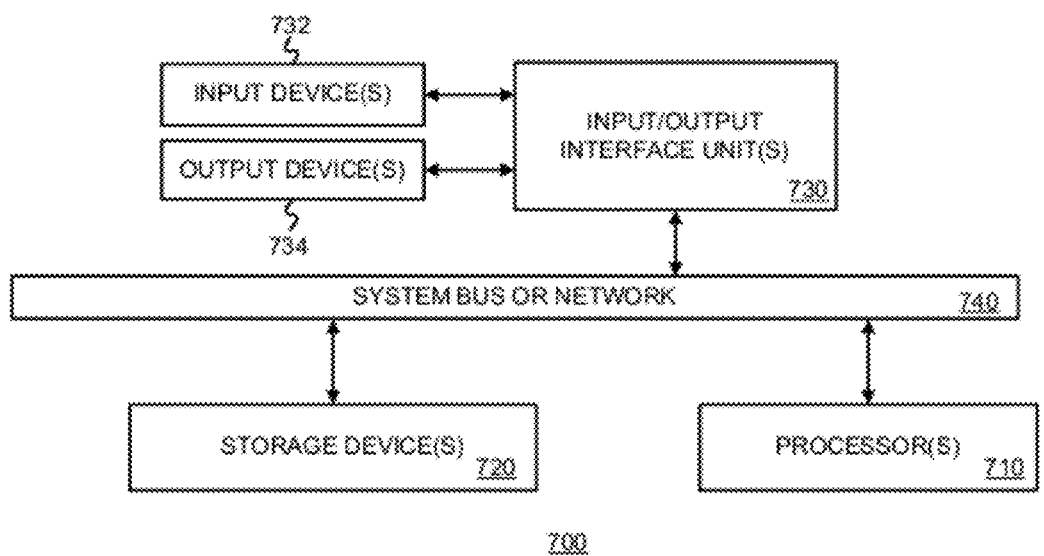
FIG. 7 is a block diagram of exemplary apparatus 700 that may be used to perform operations in a manner consistent with the present invention and/or to store information in a manner consistent with the present invention.

FIG. 7 is a block diagram of exemplary apparatus 700 that may be used to perform operations in a manner consistent with the present invention and/or to store information in a manner consistent with the present invention. The apparatus 700 includes one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. For example, one or more software modules, when executed by a processor, may be used to perform one or more of the operations and/or methods of FIGS. 2-4. At least a portion of the machine executable instructions may be stored (temporarily or more permanently) on the one or more storage devices 720 and/or may be received from an external source via one or more input interface units 730.

In one embodiment, the machine 700 may be one or more conventional personal computers or servers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a video monitor or other type of display device, which may also be connected to the system bus 740 via an appropriate interface. In addition to the video monitor, the personal computer may include other (peripheral) output devices (not shown), such as speakers and printers for example.

The operations of servers, relays and/or receivers, such as those described above, may be performed on one or more computers. Such computers may communicate with each other via one or more networks, such as the Internet for example. The various operations and information described above may be embodied by one or more machines 710. The servers, relays and/or receivers can be employed in nodes such as desktop computers, laptop computers, personal digital assistants, mobile telephones, other mobile devices, servers, etc. They can even be employed in nodes that might not have a video display screen, such as routers, modems, set top boxes, etc.

Alternatively, or in addition, at least some of the various operations and acts described above may be implemented in hardware (e.g., integrated circuits, application specific integrated circuits (ASICs), field programmable gate or logic arrays (FPGAs), etc.).

Figure 8:
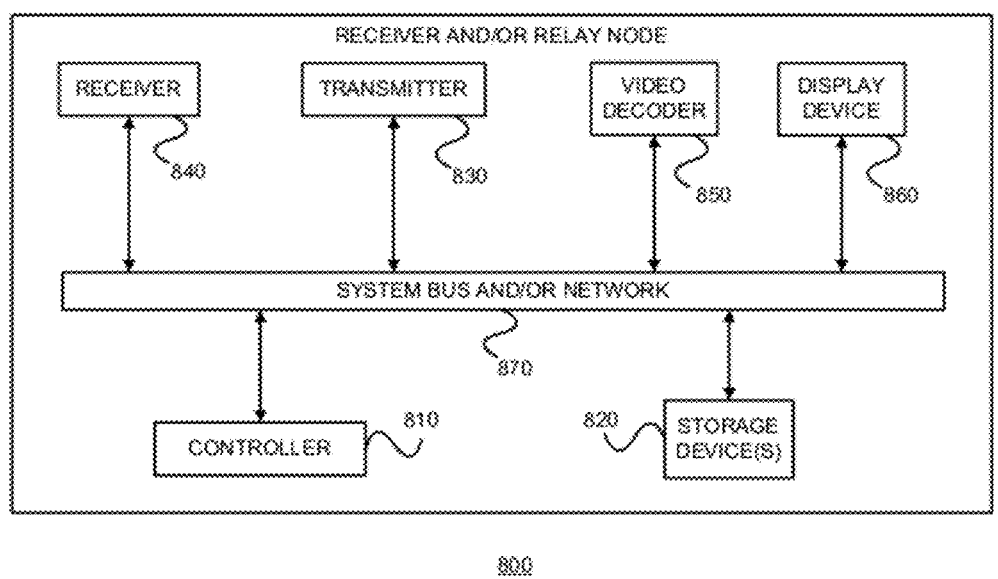
FIG. 8 is a block diagram of exemplary receiver or relay node consistent with the present invention.

FIG. 8 is a block diagram of exemplary receiver or relay node 800 consistent with the present invention. As shown, the node 800 may include a controller 810, one or more storage devices 820, a transmitter 830, a receiver 840, a video decoder 850, a display device 860 and a system bus(es) and/or network(s) 870. The various components 810-860 may communicate with each other via the system bus(es) and/or network (s) 870.

The controller 810 may include a microprocessor, an ASIC, an FPGA, etc., and may control and coordinate operations of the other components 820-860 of the node 800. The storage device(s) 820 may provide volatile and non-volatile storage of information, and/or program instructions.

The transmitter 830 may operate to relay at least a part of received video information to one or more other receiver nodes.

The receiver 840 may operate to receive one or more layers of video information (to be transmitted, to be decoded and viewed, or both). Video decoder 850 may decode received video information to be rendered on the node 800. The decoded video may then be rendered on a display device 860. (Audio portions of a video stream may be decoded and rendered on a speaker (not shown).)

§4.4 Refinements, Alternatives and Extensions

The exemplary systems described above are applicable to the multicast of both data and video (or more specifically, audio-visual signals). A difference between data and video is that video does not need to be completely delivered to be useful. A video signal can be coded into multiple layers so that receiving more layers leads to better quality (where a base layer provides adequate quality, but more received layers lead to better quality), but even just one layer (the base layer) can provide acceptable quality. Also occasional packet loss in a delivered layer may be tolerable. On the other hand, the delivery of a video segment must be received in time before its scheduled playback time. Layered coding may be exploited in at least two ways. First, the number of layers to be delivered by the sender can be adjusted based on the channel conditions of the sender-to-Group 1 links. Second, the relay nodes might forward only a subset of layers that they receive. In this way, receiver nodes in Group 1 can get much better quality than that offered by direct transmission, whereas receiver nodes in Group 2 can get video quality better than or similar to direct transmission. Considering that relays are using their own resources to help others, this differentiated quality of service may be considered "fair". For example, layers might be used to allow relay nodes to get better quality than devices in group 2. Doing so might be "fair" since relays in group 1 are consuming battery when transmitting video information (for reception by receivers in group 2). Indeed, using layers to provide differentiated quality of server might be necessary in the omni-directional transmission case since multiple time slots are used to transmit one set of video information. Otherwise, the quality of all receivers (even relays in group 1) might have to be degraded.

§4.5 Conclusions

In at least some of the exemplary embodiments described above, both the links of the access point-to-Group 1 receiver nodes and the links of the relay nodes-to-Group 2 receiver nodes have a good quality (or better quality than the worst links between the access point and receiver nodes of Group 2), and can therefore transmit at higher sustainable transmission rates than those of access point-to-Group 2 receiver nodes. Thus, the receiver nodes of Group 1 and of Group 2 can render higher quality video than in conventional video multicast schemes. For example, receiver nodes in Group 1 can get much better quality than that offered by direct transmission, whereas receiver nodes in Group 2 can get video quality better than or similar to direct transmission.

Since relay devices are intended recipients, such relay devices are free from incentive and security concerns that have hindered the practical deployment of cooperation for point-to-point communications.

In exemplary embodiments that employ layered video coding, differentiated quality of service may be provided such that receiver nodes of Group 1 (or at least relay nodes) can be provided with better quality than nodes of Group 2.

What is claimed is:

1. For use in an infrastructure-based wireless network including a video server node and a plurality of receiver nodes, a computer-implemented method comprising:
   a) determining a wireless channel condition between the video server node and each of the plurality of receiver nodes;
   b) assigning each of the plurality of receiver nodes into one of a first group and a second group using the measured wireless channel conditions, wherein receiver nodes assigned to the first group have, on average, a better determined wireless channel condition than that of receiver nodes assigned to the second group;
   c) selecting at least some of the receiver nodes of the first group of nodes as relay nodes;
   d) transmitting, wirelessly, with the video server node, video information from the video server node for reception by each of the receiver nodes assigned to the first group;
   e) transmitting, by each of the selected relay nodes, at least a part of the video information for reception by at least some of the receiver nodes of the second group such that the relay nodes collectively transmit the at least a part of the video information to all of the receiver nodes, of the second group;
   f) receiving, by receiver nodes assigned to the first group, the video information;
   g) decoding, by receiver nodes assigned to the first group, the received video information;
   h) rendering, by receiver nodes assigned to the first group, the decoded video information;
   i) receiving, by receiver nodes assigned to the second group, the at least a part of the video information;
   j) decoding, by receiver nodes assigned to the second group, at least the received at least a part of the video information to generate decoded information;
   k) rendering, by receiver nodes assigned to the second group, the decoded information;
   l) receiving in addition to the at least a part of the video information, by receiver nodes assigned to the second group, at least one of (A) copies of the at least a part of the video information from relay nodes not associated with the receiver node, and (B) the video information transmitted wirelessly by the source node; and
   m) combining (1) the received at least a part of the video information and (2) the received at least one of (A) copies of the at least a part of the video information from relay nodes not associated with the receiver node and (B) the video information transmitted wirelessly by the source node, to generate combined video information, wherein the act of decoding, by receiver nodes assigned to the second group, at least the received part of the video information decodes the combined video information to generate the decoded information.

2. The computer-implemented method of claim 1 wherein the relay nodes are selected using at least some of the measured wireless channel conditions.

3. For use in an infrastructure-based wireless network including a video server node and a plurality of receiver nodes, a computer-implemented method comprising:
   a) determining a wireless channel condition between the video server node and each of the plurality of receiver nodes;
   b) assigning each of the plurality of receiver nodes into one of a first group and a second group using the measured wireless channel conditions, wherein receiver nodes assigned to the first group have, on average, a better determined wireless channel condition than that of receiver nodes assigned to the second group;
   c) selecting at least some of the receiver nodes of the first group of nodes as relay nodes;
   d) transmitting, wirelessly (with the video server node, video information from the video server node for reception by each of the receiver nodes assigned to the first group; and
   e) transmitting, by each of the selected relay nodes, at least a part of the video information for reception by at least some of the receiver nodes of the second group such that the relay nodes collectively transmit the at least a part of the video information to all of the receiver nodes of the second group, wherein a number S of relay nodes are assigned, and wherein the act of transmitting, by each of the selected relay nodes, at least a part of the video information for reception by at least some of the receiver nodes of the second group is performed with an omni-directional transmission by each of the S relay nodes in S respective time slots.

4. The computer-implemented method of claim 3 wherein the video server node is one of (A) a wireless access point, or (B) a base station.

5. The computer-implemented method of claim 3 wherein receiver nodes assigned to the first group have, on average over time, a better measured wireless channel condition than that of receiver nodes assigned to the second group.

6. The computer-implemented method of claim 3 wherein the video information transmitted wirelessly by the video server node is a function of a poorest measured wireless channel condition between the video server node and the receiver nodes assigned to the first group.

7. The computer-implemented method of claim 6 wherein the at least a part of the video information transmitted, by each of the selected relay nodes, to at least some of the receiver nodes of the second group is a function of at least one of (A) a poorest measured wireless channel condition between the video server node and the receiver nodes assigned to the second group, and (B) a poorest measured wireless channel condition between the relay nodes and the receiver nodes assigned to the second group.

8. The computer-implemented method of claim 3 wherein the relay nodes are selected using at least some of the measured wireless channel conditions.

9. For use in an infrastructure-based wireless network including a video server node and a plurality of receiver nodes, a computer-implemented method comprising:
   a) determining a wireless channel condition between the video server node and each of the plurality of receiver nodes;
   b) assigning each of the plurality of receiver nodes into one of a first group and a second group using the measured wireless channel conditions, wherein receiver nodes assigned to the first group have, on average, a better determined wireless channel condition than that of receiver nodes assigned to the second group;
   c) selecting at least some of the receiver nodes of the first group of nodes as relay nodes;
   d) transmitting, wirelessly, with the video server node, video information from the video server node for reception by each of the receiver nodes assigned to the first group; and
   e) transmitting, by each of the selected relay nodes, at least a part of the video information for reception by at least some of the receiver nodes of the second group such that the relay nodes collectively transmit the at least a part of the video information to all of the receiver nodes of the second group,
   wherein the act of transmitting, by each of the selected relay nodes, at least a part of the video information for reception by at least some of the receiver nodes of the second group is performed with an T directional transmissions by each of the relay nodes.

10. The computer-implemented method of claim 9 wherein the relay nodes are selected using at least some of the measured wireless channel conditions.

11. The computer-implemented method of claim 9 wherein the video server node is one of (A) a wireless access point, or (B) a base station.

12. The computer-implemented method of claim 9 wherein receiver nodes assigned to the first group have, on average over time, a better measured wireless channel condition than that of receiver nodes assigned to the second group.

13. The computer-implemented method of claim 9 wherein the video information transmitted wirelessly by the video server node is a function of a poorest measured wireless channel condition between the video server node and the receiver nodes assigned to the first group.

14. The computer-implemented method of claim 13 wherein the at least a part of the video information transmitted, by each of the selected relay nodes, to at least some of the receiver nodes of the second group is a function of at least one of (A) a poorest measured wireless channel condition between the video server node and the receiver nodes assigned to the second group, and (B) a poorest measured wireless channel condition between the relay nodes and the receiver nodes assigned to the second group.

15. For use in an infrastructure-based wireless network including a video server node and a plurality of receiver nodes, a computer-implemented method comprising:
   a) determining a wireless channel condition between the video server node and each of the plurality of receiver nodes;
   b) assigning each of the plurality of receiver nodes into one of a first group and a second group using the measured wireless channel conditions, wherein receiver nodes assigned to the first group have, on average, a better determined wireless channel condition than that of receiver nodes assigned to the second group;
   c) selecting at least some of the receiver nodes of the first group of nodes as relay nodes;
   d) transmitting, wirelessly, with the video server node, video information from the video server node for reception by each of the receiver nodes assigned to the first group; and
   e) transmitting, by each of the selected relay nodes, at least a part of the video information for reception by at least some of the receiver nodes of the second group such that the relay nodes collectively transmit the at least part of the video information to all of the receiver nodes of the second group,
   wherein the video information includes N layers of video data, wherein the at least a part of the video information includes M layers of the video data, and wherein M<N.

16. The computer-implemented method of claim 15 further comprising:
   f) receiving, by receiver nodes assigned to the first group, the video information;
   g) decoding, by receiver nodes assigned to the first group, the received video information;
   h) playing, by receiver nodes assigned to the first group, the decoded video information to render video of a first quality;
   i) receiving, by receiver nodes assigned to the second group, the at least a part of the video information;
   j) decoding, by receiver nodes assigned to the second group, the received at least a part of the video information; and
   k) playing, by receiver nodes assigned to the second group, the decoded at least a part of the video information to render video of a second quality, wherein the second quality is lower than the first quality.

17. The computer-implemented method of claim 15 wherein the relay nodes are selected using at least some of the measured wireless channel conditions.

18. The computer-implemented method of claim 15 wherein the video server node is one of (A) a wireless access point, or (B) a base station.

19. The computer-implemented method of claim 15 wherein receiver nodes assigned to the first group have, on average over time, a better measured wireless channel condition than that of receiver nodes assigned to the second group.

20. The computer-implemented method of claim 15 wherein the video information transmitted wirelessly by the video server node is a function of a poorest measured wireless channel condition between the video server node and the receiver nodes assigned to the first group.

21. The computer-implemented method of claim 20 wherein the at least a part of the video information transmitted, by each of the selected relay nodes, to at least some of the receiver nodes of the second group is a function of at least one of (A) a poorest measured wireless channel condition between the video server node and the receiver nodes assigned to the second group, and (B) a poorest measured wireless channel condition between the relay nodes and the receiver nodes assigned to the second group.

22. For use in an infrastructure-based wireless network including a video server node and a plurality of receiver node, apparatus comprising:
   a) at least one processor;
   b) at least one input device; and
   c) at least one storage device storing program instructions which, when executed by the at least one processor, performs a method including:
      1) determining a wireless channel condition between the video server node and each of the plurality of receiver nodes;
      2) assigning each of the plurality of receiver nodes into one of a first group and a second group using the measured wireless channel conditions, wherein receiver nodes assigned to the first group have, on average, a better determined wireless channel condition than that of receiver nodes assigned to the second group,
      3) selecting at least some of the receiver nodes of the first group of nodes as relay nodes,
      4) transmitting, wirelessly, with the video server node, video information from the video server node for reception by each of the receiver nodes assigned to the first group,
      5) transmitting, by each of the selected relay nodes, at least a part of the video information for reception by at least some of the receiver nodes of the second group such that the relay nodes collectively transmit the at least a part of the video information to all of the receiver nodes of the second group,
      6) receiving, by receiver nodes assigned to the first group, the video information,
      7) decoding, by receiver nodes assigned to the first group, the received video information,
      8) rendering, by receiver nodes assigned to the first group, the decoded video information,
      9) receiving, by receiver nodes assigned to the second group, the at least a part of the video information,
      10) decoding, by receiver nodes assigned to the second group, at least the received at least a part of the video information to generate decoded information,
      11) rendering, by receiver nodes assigned to the second group, the decoded information,
      12) receiving in addition to the at least a part of the video information, by receiver nodes assigned to the second group, at least one of (A) copies of the at least a part of the video information from relay nodes not associated with the receiver node, and (B) the video information transmitted wirelessly by the source node, and
      13) combining (1) the received at least a part of the video information and (2) the received at least one of (A) copies of the at least a part of the video information from relay nodes not associated with the receiver node and (B) the video information transmitted wirelessly by the source node, to generate combined video information, wherein the act of decoding, by receiver nodes assigned to the second group, at least the received part of the video information decodes the combined video information to generate the decoded information.

23. The apparatus of claim 22 wherein the relay nodes are selected using at least some of the measured wireless channel conditions.

24. For use in an infrastructure-based wireless network including a video server node and a plurality of receiver node, apparatus comprising:
   a) at least one processor;
   b) at least one input device; and
   c) at least one storage device storing program instructions which, when executed by the at least one processor, performs a method including:
      1) determining a wireless channel condition between the video server node and each of the plurality of receiver nodes,
      2) assigning each of the plurality of receiver nodes into one of a first group and a second group using the measured wireless channel conditions, wherein receiver nodes assigned to the first group have, on average, a better determined wireless channel condition than that of receiver nodes assigned to the second group,
      3) selecting at least some of the receiver nodes of the first group of nodes as relay nodes,
      4) transmitting, wirelessly, with the video server node, video information from the video server node for reception by each of the receiver nodes assigned to the first group, and
      5) transmitting, by each of the selected relay nodes, at least a part of the video information for reception by at least some of the receiver nodes of the second group such that the relay nodes collectively transmit the at least a part of the video information to all of the receiver nodes of the second group,
   wherein a number S of relay nodes are assigned, and
   wherein the act of transmitting, by each of the selected relay nodes, at least a part of the video information for reception by at least some of the receiver nodes of the second group is performed with an omni-directional transmission by each of the S relay nodes in S respective time slots.

25. The apparatus of claim 24 wherein the relay nodes are selected using at least some of the measured wireless channel conditions.

26. The apparatus of claim 24 wherein the video server node is one of (A) a wireless access point or (B) a base station.

27. The apparatus of claim 24 wherein receiver 2 nodes assigned to the first group have, on average over time, a better measured wireless channel condition than that of receiver nodes assigned to the second group.

28. The apparatus of claim 24 wherein the video information transmitted wirelessly by the video server node is a function of a poorest measured wireless.

29. The apparatus of claim 28 wherein the at least a part of the video information transmitted, by each of the selected relay nodes, to at least some of the receiver nodes of the second group is a function of at least one of (A) a poorest measured wireless channel condition between the video server node and the receiver nodes assigned to the second group, and (B) a poorest measured wireless channel condition between the relay nodes and the receiver nodes assigned to the second group.

30. For use in an infrastructure-based wireless network including a video server node and a plurality of receiver node, apparatus comprising:
   a) at least one processor;
   b) at least one input device; and
   c) at least one storage device storing program instructions which, when executed by the at least one processor, performs a method including:
      1) determining a wireless channel condition between the video server node and each of the plurality of receiver nodes,
      2) assigning each of the plurality of receiver nodes into one of a first group and a second group using the measured wireless channel conditions, wherein receiver nodes assigned to the first group have, on average, a better determined wireless channel condition than that of receiver nodes assigned to the second group,
      3) selecting at least some of the receiver nodes of the first group of nodes as relay nodes,
      4) transmitting, wirelessly, with the video server node, video information from the video server node for reception by each of the receiver nodes assigned to the first group, and
      5) transmitting, by each of the selected relay nodes, at least a part of the video information for reception by at least some of the receiver nodes of the second group such that the relay nodes collectively transmit the at least a part of the video information to all of the receiver nodes of the second group,
   wherein the act of transmitting, by each of the selected relay nodes, at least a part of the video information for reception by at least some of the receiver nodes of the second group is performed with an T directional transmissions by each of the relay nodes.

31. The apparatus of claim 30 wherein the relay nodes are selected using at least some of the measured wireless channel conditions.

32. The apparatus of claim 30 wherein the video server node is one of (A) a wireless access point, or (B) a base station.

33. The apparatus of claim 30 wherein receiver nodes assigned to the first group have, on average over time, a better measured wireless channel condition than that of receiver nodes assigned to the second group.

34. The apparatus of claim 30 wherein the video information transmitted wirelessly by the video server node is a function of a poorest measured wireless channel condition between the video server node and the receiver nodes assigned to the first group.

35. The apparatus of claim 34 wherein the at least a part of the video information transmitted, by each of the selected relay nodes, to at least some of the receiver nodes of the second group is a function of at least one of (A) a poorest measured wireless channel condition between the video server node and the receiver nodes assigned to the second group, and (B) a poorest measured wireless channel condition between the relay nodes and the receiver nodes assigned to the second group.

36. For use in an infrastructure-based wireless network including a video server node and a plurality of receiver node, apparatus comprising:
   a) at least one processor;
   b) at least one input device; and
   c) at least one storage device storing program instructions which, when executed by the at least one processor, performs a method including:
      1) determining a wireless channel condition between the video server node and each of the plurality of receiver nodes,
      2) assigning each of the plurality of receiver nodes into one of a first group and a second group using the measured wireless channel conditions, wherein receiver nodes assigned to the first group have, on average, a better determined wireless channel condition than that of receiver nodes assigned to the second group,
      3) selecting at least some of the receiver nodes of the first group of nodes as relay nodes,
      4) transmitting, wirelessly, with the video server node, video information from the video server node for reception by each of the receiver nodes assigned to the first group, and
      5) transmitting, by each of the selected relay nodes, at least a part of the video information for reception by at least some of the receiver nodes of the second group such that the relay nodes collectively transmit the at least a part of the video information to all of the receiver nodes of the second group,
   wherein the video information includes N layers of video data, wherein the at least a part of the video information includes M layers of the video data, and wherein M<N.

37. The apparatus of claim 36 further comprising:
   6) receiving, by receiver nodes assigned to the first group, the video information,
   7) decoding, by receiver nodes assigned to the first group, the received video information,
   8) playing, by receiver nodes assigned to the first group, the decoded video information to render video of a first quality,
   9) receiving, by receiver nodes assigned to the second group, the at least a part of the video information,
   10) decoding, by receiver nodes assigned to the second group, the received at least a part of the video information, and
   11) playing, by receiver nodes assigned to the second group, the decoded at least a part of the video information to render video of a second quality, wherein the second quality is lower than the first quality.

38. The apparatus of claim 36 wherein the relay nodes are selected using at least some of the measured wireless channel conditions.

39. The apparatus of claim 36 wherein the video server node is one of (A) a wireless access point, or (B) a base station.

40. The apparatus of claim 36 wherein receiver nodes assigned to the first group have, on average over time, a better measured wireless channel condition than that of receiver nodes assigned to the second group.

41. The apparatus of claim 36 wherein the video information transmitted wirelessly by the video server node is a function of a poorest measured wireless channel condition between the video server node and the receiver nodes assigned to the first group.

42. The apparatus of claim 41 wherein the at least a part of the video information transmitted, by each of the selected relay nodes, to at least some of the receiver nodes of the second group is a function of at least one of (A) a poorest measured wireless channel condition between the video server node and the receiver nodes assigned to the second group, and (B) a poorest measured wireless channel condition between the relay nodes and the receiver nodes assigned to the second group.

* * * * *